United States Patent
Engel et al.

(10) Patent No.: US 10,456,995 B2
(45) Date of Patent: *Oct. 29, 2019

(54) LAYING UNIT, DEVICE AND METHOD FOR PRODUCING A FIBER COMPOSITE COMPONENT

(71) Applicant: AIRBUS DEFENCE AND SPACE GMBH, Taufkirchen (DE)

(72) Inventors: Franz Engel, Munich (DE); Christian Weimer, Munich (DE); Tilman Orth, Munich (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 245 days.

This patent is subject to a terminal disclaimer.

(21) Appl. No.: 15/359,077

(22) Filed: Nov. 22, 2016

(65) Prior Publication Data
US 2017/0144384 A1 May 25, 2017

(30) Foreign Application Priority Data
Nov. 24, 2015 (EP) .................. 15196004

(51) Int. Cl.
*B29C 70/30* (2006.01)
*B29C 70/54* (2006.01)
(Continued)

(52) U.S. Cl.
CPC ............ *B29C 70/30* (2013.01); *B29C 70/388* (2013.01); *B29C 70/54* (2013.01);
(Continued)

(58) Field of Classification Search
CPC ......... Y10T 156/1348; Y10T 156/1788; Y10T 156/1795; B29C 70/30; B29C 70/32; B29C 70/323; B29C 70/326; B29C 70/38; B29C 70/382; B29C 70/384; B29C 70/386; B29C 70/388
See application file for complete search history.

(56) References Cited

U.S. PATENT DOCUMENTS

| 4,588,466 A | 5/1986 | Eaton |
| 6,073,670 A | 6/2000 | Koury |

(Continued)

FOREIGN PATENT DOCUMENTS

| DE | 10 2010 039955 A1 | 3/2012 |
| DE | 20 2011 110 519 U1 | 7/2014 |

OTHER PUBLICATIONS

German Search Report for Application No. 15196015 dated May 10, 2016.
(Continued)

*Primary Examiner* — Carson Gross
(74) *Attorney, Agent, or Firm* — Jenkins, Wilson, Taylor & Hunt, P.A.

(57) ABSTRACT

A laying unit for producing a fiber composite component includes a drive device which is formed for magnetic cooperation with a running face, which provides a magnetic field and/or is ferromagnetic, to advance the laying unit on the running face. A device for producing a fiber composite component comprising a laying unit of this type and a method for producing a fiber composite component comprising a device of this type are disclosed.

14 Claims, 10 Drawing Sheets

(51) Int. Cl.
*B29C 70/38* (2006.01)
*B29L 31/00* (2006.01)
*B29C 53/80* (2006.01)

(52) U.S. Cl.
CPC ..... *B29C 53/8008* (2013.01); *B29L 2031/731* (2013.01); *Y10T 156/1348* (2015.01); *Y10T 156/1788* (2015.01); *Y10T 156/1795* (2015.01)

(56) References Cited

U.S. PATENT DOCUMENTS

| | | | |
|---|---|---|---|
| 7,282,107 | B2 | 10/2007 | Johnson et al. |
| 8,394,222 | B2 | 3/2013 | Rettig |
| 9,375,907 | B2 | 6/2016 | Boge et al. |
| 9,789,609 | B2 * | 10/2017 | Crothers ................. B25J 9/009 |
| 2005/0236735 | A1 * | 10/2005 | Oldani ................. B29C 7/0382 |
| | | | 264/257 |
| 2006/0260751 | A1 | 11/2006 | Lauder et al. |
| 2010/0193103 | A1 | 8/2010 | McCowin |
| 2013/0158697 | A1 * | 6/2013 | Stone .................... B25J 9/1682 |
| | | | 700/114 |
| 2015/0224941 | A1 | 8/2015 | Bernstein et al. |
| 2017/0144387 | A1 | 5/2017 | Engel et al. |

OTHER PUBLICATIONS

German Search Report for Application No. 15196004 dated May 18, 2016.
Non-Final Office Action for U.S. Appl. No. 15/359,038 dated Oct. 18, 2018.
Final Office Action for U.S. Appl. No. 15/359,038 dated Mar. 12, 2019.

* cited by examiner

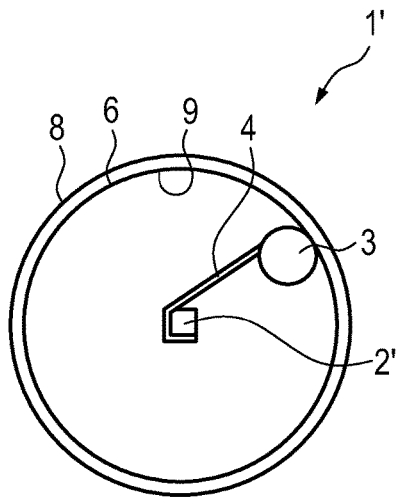
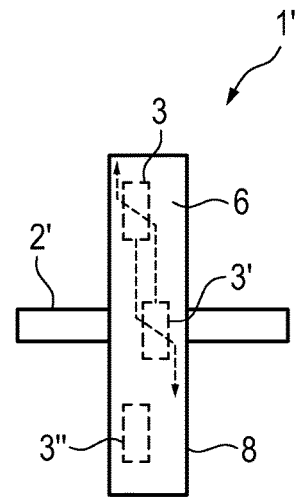
Fig. 2A  Fig. 2B
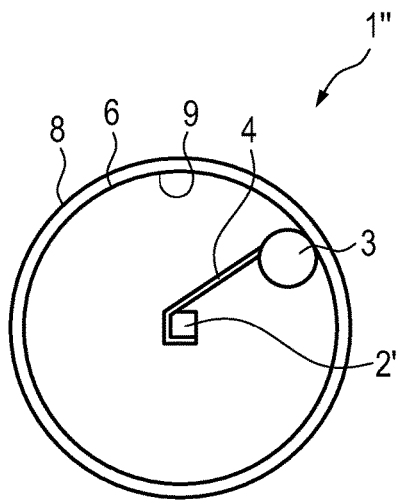
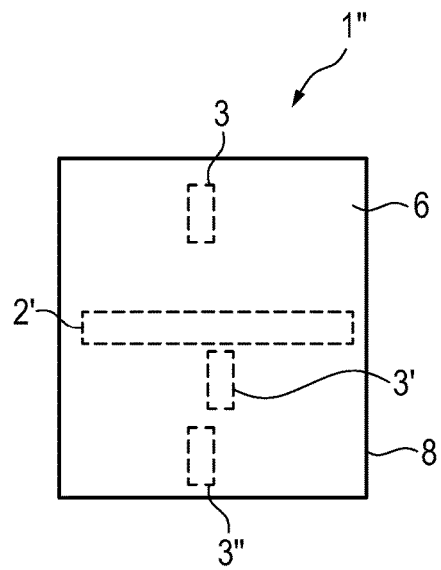
Fig. 3A  Fig. 3B

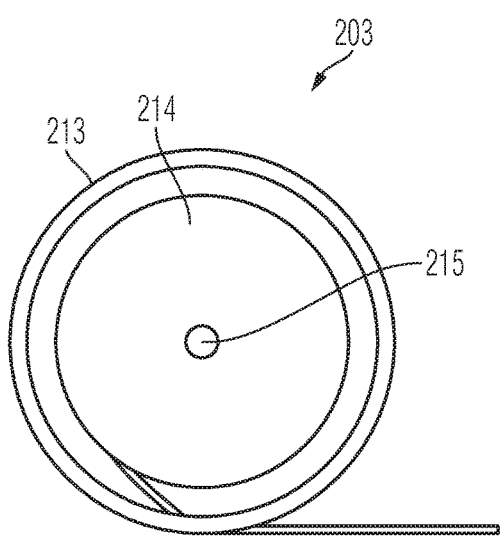
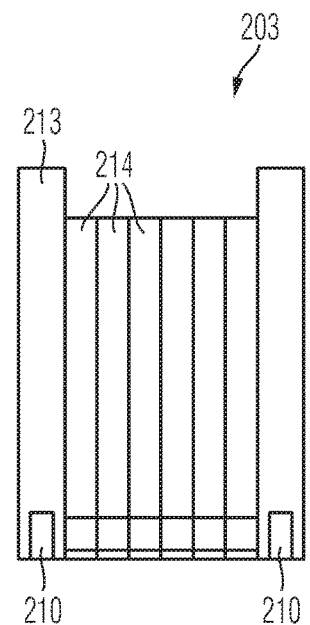
Fig. 11A     Fig. 11B
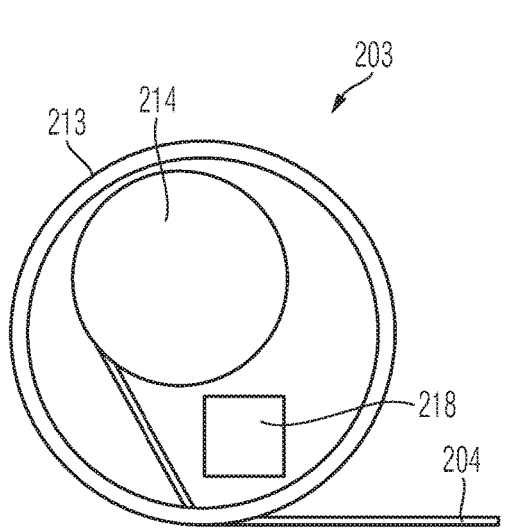
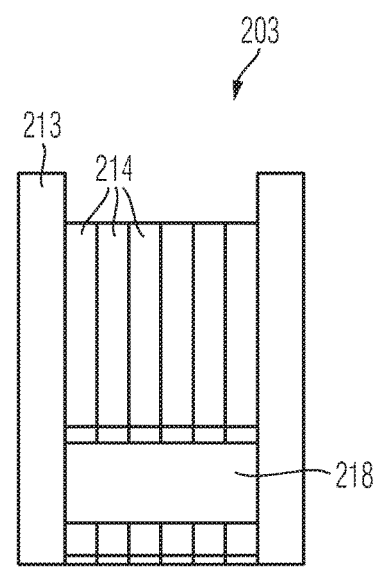
Fig. 12A     Fig. 12B

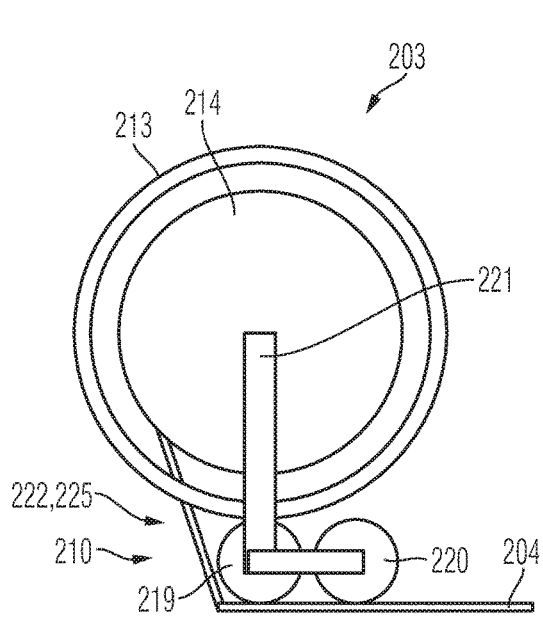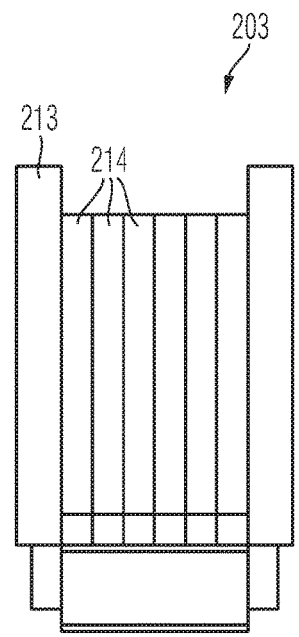
Fig. 15A  Fig. 15B
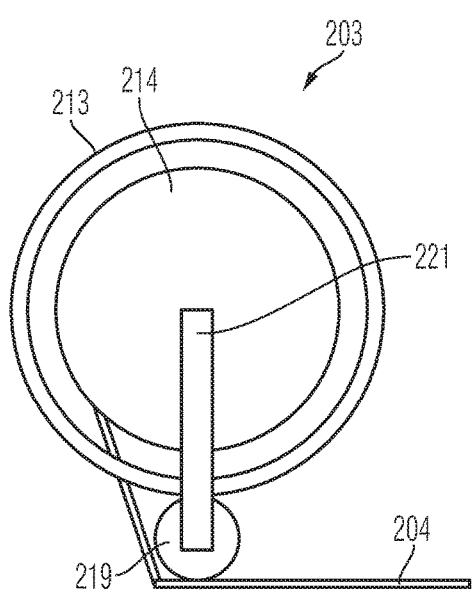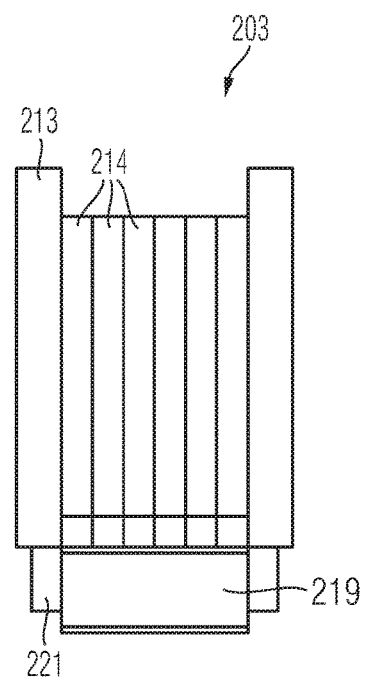
Fig. 16A  Fig. 16B

LAYING UNIT, DEVICE AND METHOD FOR PRODUCING A FIBER COMPOSITE COMPONENT

CROSS-REFERENCE TO RELATED APPLICATION

This application claims priority to European Patent Application EP 15 196 004.4 filed Nov. 24, 2015, the entire disclosure of which is incorporated by reference herein.

TECHNICAL FIELD

The present disclosure relates to a laying unit and to a device and a method for producing a fiber composite component.

BACKGROUND

Although they are applicable to any fiber composite material and any components, the present disclosure and the set of problems on which it is based are described in greater detail with reference to carbon-fiber-reinforced plastics materials (CFRP) and large components, for example fuselage parts of an aircraft or spacecraft.

At present, large CFRP components are generally manufactured using automated fiber placement (AFP) technology. For this purpose, very large-scale systems are required. This generally involves a laying robot running suspended on a gantry, comprising a fiber placement head or tape laying head which lays fibers on a shaping tool, for example the cast of a fuselage portion of an aircraft or spacecraft.

An approach to a fiber laying device differing from systems of this type is described in DE 20 2011 110 519 U1. A rail system is provided comprising a number of rails and a plurality of laying robots which are movable on the rail system along the rails. The laying robots and the rail system are controlled by a central master computer.

SUMMARY

One of the ideas of the present disclosure is to provide an improved laying unit and an improved device and an improved method for producing a fiber composite component.

Accordingly, the following are provided:
a laying unit for producing a fiber composite component, comprising a drive device which is formed for magnetic cooperation with a running face, which provides a magnetic field and/or is ferromagnetic, to advance the laying unit on the running face;
a device for producing a fiber composite component, comprising: a shaping tool; and a laying unit according to the present disclosure; and
a method for producing a fiber composite component, in particular by a laying unit according to the present disclosure and/or by a device according to the present disclosure, comprising the following method steps: providing a shaping tool and a magnetically drivable laying unit which is provided or formed for laying a fiber material on the tool, and laying the fiber material on the shaping tool in a predetermined fiber arrangement by way of magnetically driven advancement of the laying unit on a running face, which provides a magnetic field and/or is ferromagnetic.

The finding behind the present disclosure is to advance a laying unit for laying fiber material on a running face by a drive based on magnetism. For this purpose, a drive device of the laying unit and/or the running face can be magnetically activated in such a way that a magnetic field acting to advance the laying unit is provided.

The magnetic field can bring about advancement in various ways. To bring about the advancement, the laying unit or a drive device of the laying unit can be magnetically attracted or repelled.

Further, as an alternative or in addition to bringing about the advancement, a mass element, movable internally or externally on the laying unit or on a housing thereof, of the drive unit may be displaced and/or deflected in such a way that the displacement and/or deflection of the mass element leads to advancement of the laying unit. For example, this may lead to rolling or tilting of the laying unit or the housing thereof.

In some embodiments, the laying unit may comprise a control device for actuating the drive device.

In some embodiments, the drive device comprises controllable magnets. These are formed to hold the laying unit on the running face during cooperation with the ferromagnetic running face and/or to drive it in a predetermined advancement. Advantageously, the drive device can thus advance automatically on the ferromagnetic running face. Further, as a result of the magnetic attraction to the laying unit according to the present disclosure, fiber material can also advantageously be laid using a running face which is vertical or extends overhead.

The ferromagnetic running face may additionally comprise controllable magnets or permanent magnets cooperating with the controllable magnets of the drive device.

The controllable magnets of the drive device may be provided or implemented in various ways. In one embodiment, the drive device is formed as a pendulum provided to be integrated into the laying unit, in particular inside a housing of the laying unit. The pendulum moves in a magnetically driven manner, for example at a minimum distance along an inner face or surface of the housing of the laying unit. The laying unit or the housing thereof is rolled or tilted so as to follow the pendulum.

As an alternative or in addition to a pendulum, movable controllable magnets may also be provided on a guidance system provided inside the laying unit, in particular on the inner face of the housing thereof. For example, rails or grooves are conceivable as a guide system.

In some embodiments, an outer skin of the housing or a layer of the laying unit provided close to an outer skin may be formed to be magnetisable. In particular, actuable electromagnets may be provided integrated into the outer skin of the laying unit. To advance the laying unit, the magnetic field is shifted along the magnetisable outer skin or layer in the desired direction of travel by way of corresponding actuation.

In addition to a controllable magnetic field, a constantly acting or static magnetic field may also be provided between the laying unit and the running face. Thus, the laying unit can be held on the running face independently of an advancement, for example including for laying fiber material overhead. Further, a compacting force applied to the material by the laying unit can thus also be set to a predetermined value. The constantly acting or static magnetic field can be provided by controllable and/or permanent magnets.

In some embodiments, the drive device comprises a ferromagnetic mass element. This is formed to hold the laying unit on the running face during cooperation with the running face providing a magnetic field and/or to drive it in a predetermined advancement. Advantageously, in this embodiment no complex arrangement of controllable magnets has to be integrated into the laying unit. The ferromagnetic mass element can be provided movably inside a housing of the laying unit.

In some embodiments of the drive device, it may be conceivable for the magnetic drive to be assisted by an additional drive of a different type, for example by one or more electric motors, pneumatic motors or hydraulic motors. Further, in addition, a drive by compressed air is conceivable, for example by way of repulsion or in the form of a pulsed drive.

In some embodiments of the laying unit, a receiving portion is provided which is formed with a housing. In particular, the receiving portion may be formed to hold a stock of fiber material in reserve, for example in the form of a fiber coil. Thus, the laying unit can advantageously transport along the fiber material, which therefore does not have to be supplied externally, for laying at a predetermined location. In a further development, the fiber material is supplied externally by way of a supply device, the laying unit laying the fiber material at the predetermined location. In this embodiment too, a housing is provided to form a receiving portion for receiving the further components of the laying unit. The housing may be any type of mechanical housing. The housing may be formed closed or open at one or more faces. In particular, in the case of a cylindrical housing, a surface may be recessed in part or in whole. A frame-like embodiment of the housing which is open at all faces is also possible. Further, the housing may be formed divided into a plurality of housing portions. In particular, these may be two end-face end portions of the housing, it being possible in particular for the fiber coil or a plurality of fiber coils to be arranged in between. Intermediate portions of the housing may also be provided, in particular between the fiber coils.

In one embodiment, a holding device is provided which holds or mounts the components of the laying unit inside the housing. The holding device itself may be provided mounted in a fixed or movable manner inside the housing. For a movable holding device, the position of the components is corrected in such a way that they are always orientated in a desired direction adapted to the advancement of the laying unit. For example, for this purpose, an inner housing, which is rotatable relative to the housing, may be provided inside the housing with a slightly lower diameter. For this purpose, the inner housing may be coupled to the housing via mechanical or magnetic bearings. A configuration of this type is conceivable in particular for a conical or cylindrical housing.

In some embodiments, the drive device is provided on or in the housing. The housing is formed to be able to be rolled along on the running face to advance the laying unit. The housing thus simultaneously performs a plurality of roles of receiving the fiber material and providing a rolling face which can be rolled along on the running face to advance the laying unit.

In a further embodiment, the drive device comprises magnets and/or ferromagnetic mass elements which are movable relative to the housing. In particular, these are provided movably on the periphery of the housing. Advantageously, the drive device may therefore also be arranged in the immediate vicinity of the running face, in particular directly on the running face, during the advancement of the laying unit.

In a further embodiment, the drive device is formed as a drive roller coupled to the housing. Advantageously, this is a drive device which is comparatively simple to produce and which is provided merely coupled to rather than integrated into the housing. Further, a drive roller of this type may also provide additional stability of the laying unit when stationary or during advancement.

In some embodiments, the drive device is formed as a laying device for laying and/or compacting a fiber material on a tool in a defined manner. In particular, this may be provided in the case of a drive device in the form of a drive roller. Advantageously, in addition to the function of force transmission to the running face, the drive roller thus also takes on the function of laying and/or compacting the fiber material in a defined manner. The laying unit can thus advantageously also be used to compact previously laid fiber material. The forces applicable by the laying device for laying and/or compacting in a defined manner can be regulated or set by way of the strength of the magnetic field provided for advancing and/or holding the laying unit on the running face.

In a further embodiment, the drive device is provided as a heating device for activating a resin or binder of the laid fiber material. In this context, there is a particular synergistic effect with the magnetic drive, since this produces eddy currents during advancement which heat the heating device and/or the running face locally because of the electrical resistances thereof. The heating device may in particular be formed as a self-heating drive roller and/or as a drive roller which heats the running face. Further, a combined embodiment of the drive device is possible, in particular in the form of a drive roller, as a laying device for laying and/or compacting in a defined manner and as a heating device for activating a resin or binder. Advantageously, functional integration is thus provided in one component.

In one embodiment of a device for producing a fiber composite component, the shaping tool is formed as a running face. In particular, it is a ferromagnetic running face. The running face, in other words the tool, is formed in such a way that the laying unit can be advanced by way of magnetic cooperation between the drive device and the running face on the running face. Advantageously, the laying unit may thus advance directly on the tool under magnetic drive.

In a further embodiment of the device for producing a fiber composite component, a hollow body is provided, the inner face of which is formed as a running face for the laying unit. On this, the laying unit can be advanced by magnetic cooperation with the running face. The shaping tool can thus be arranged inside the hollow body in such a way that the laying unit advancing on the running face winds or twists the fiber material around the tool. By winding or twisting around a shaping tool, complex geometries can advantageously be formed. In this case, the shaping tool may also be formed as a core, optionally as a lost core. Other complex geometries having high flexibility, for example having a wide range of winding or twisting patterns or else having different shapes and/or different sizes of tools and hollow bodies, may further be formed.

In one embodiment, the running face contains controllable magnets, which are formed to be actuable to cooperate with the drive device for magnetically driven advancement of the laying unit on the running face. The laying units each comprise a drive device which cooperates with the controllable magnets of the running face for magnetically driven advancement on the running face. The magnets are actuated for advancement of the individual laying units on the running face by a control unit. Preferably, this takes place using the control units inherent to each laying unit.

In one embodiment, the running face comprises communication devices, which are configured to transmit control commands of a control device to actuate the controllable magnets to advance the laying unit. In particular, the communication devices are configured to transmit control commands of the control devices integrated into the laying units to actuate the controllable magnets to advance the laying unit. Advantageously, the laying unit may thus advance autonomously on the running face under magnetic drive, without necessarily containing controllable magnets itself.

The above embodiments and developments can be combined in any desired manner, within reason. Further, all features of the laying unit and of the device for producing a fiber composite component are transferrable to the method for producing a fiber composite component. Further possible embodiments, developments and implementations of the present disclosure also include combinations not explicitly mentioned of features of the present disclosure which are described above or in the following in relation to the embodiments. In particular, a person skilled in the art will also add individual aspects to the relevant basic form of the present disclosure as improvements or additions.

BRIEF DESCRIPTION OF THE DRAWINGS

In the following, the present disclosure is described in greater detail with reference to the accompanying drawings. The elements of the drawings are not necessarily shown to scale.

In the drawings:

FIG. 2A is a schematic front view of a device for producing a fiber composite component in accordance with a further embodiment;

FIG. 2B is a schematic side view of a device for producing a fiber composite component in accordance with a further embodiment;

FIG. 3A, 3B show the device for producing a fiber composite component with a first modification;

FIG. 11A is a schematic longitudinal sectional view of a cylindrical laying unit;

FIG. 11B is a schematic cross-sectional view of the laying unit of FIG. 11A;

FIG. 12A, 12B show a laying unit in accordance with a further embodiment;

FIG. 15A, 15B show a laying unit comprising a laying device;

FIG. 16A, 16B show a laying unit in accordance with a further embodiment;

DETAILED DESCRIPTION

Figure 1:
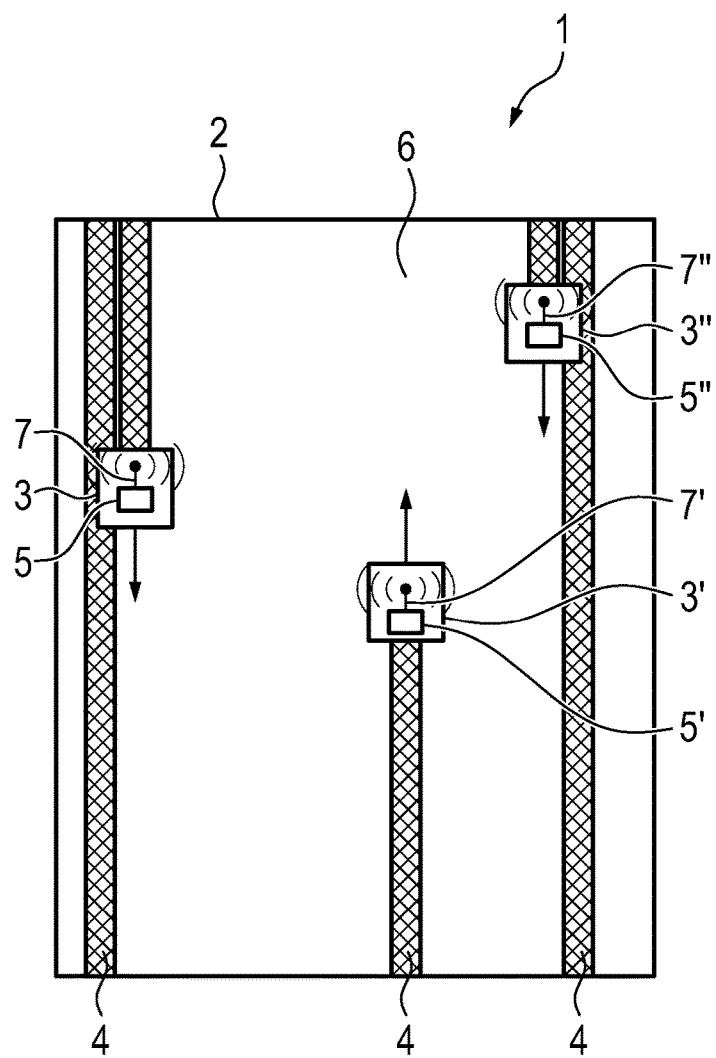
FIG. 1 is a schematic plan view of a device for producing a fiber composite component.

In the drawings, unless otherwise specified, like reference numerals denote like or functionally equivalent components.

FIG. 1 is a schematic plan view of a device 1 for producing a fiber composite component.

The device 1 comprises a shaping tool 2 and a plurality of laying units 3, 3', 3". The tool 2 is formed as a running face 6 for the laying units 3, 3', 3".

The laying units 3, 3', 3" are each formed to lay a fiber material 4 on the shaping tool 2. They each comprises a control device 5, 5', 5", which is configured to actuate the relevant laying unit 3, 3', 3" in automatic cooperation with the further laying units 3, 3', 3" for jointly laying a predetermined fiber arrangement.

The laying units 3, 3', 3" are shown while laying the fiber material 4, a number of three laying units 3, 3', 3" being shown purely by way of example. Instead of three, there may be any other desired number of laying units 3, 3', ( . . . ), 3ⁿ.

The laying units 3, 3', 3" are each formed for autonomous advancement on the running face 6. Accordingly, they comprise sensors (not shown in detail) and a drive device, which cooperate with the control device 5, 5', 5" for autonomous advancement. The sensors detect regions already occupied by fiber material 4, edge regions of the tool 2, and further laying units. Further, the laying units 3, 3', 3" each comprise communication devices 7, 7', 7" which are provided for communication between the laying units 3, 3', 3". Thus, the pattern or the distribution of the fiber arrangement among the laying units 3, 3', 3" for laying the arrangement can be flexibly adjusted.

A laying unit is always actuated by the control device 5, 5', 5" in such a way that a closest portion of the tool 2 to be occupied by a fiber layer of the fiber material 4 is occupied, in a manner which is simple to determine geometrically, in particular a straight line.

The communication devices 7, 7', 7" share information about previously laid portions between the laying units. Thus, the advancement paths of the laying units only cross if this is desired for the pattern to be laid of the fiber arrangement or if a laying unit moves to a new start point.

Upon reaching an edge or boundary of the tool 2 or a portion already occupied with fiber material 4 in the desired manner, the laying unit 3, 3', 3" changes the advancement direction thereof under the actuation by the control device. For example, the laying unit rotates with an offset of a width of a fiber layer or laying path of the fiber material 4, and lays a further fiber layer on the previously laid laying path during an advance in the opposite direction. If there are no free portions of the tool present adjacently, the laying unit moves to a new start point which is not yet laid with a desired fiber layer. The start point is preferably selected, by way of the information conveyed from the other laying units, at a point on the tool where there has not yet been any laying in the desired manner.

This procedure is continued, in particular autonomously, until there are no longer any free portions of the tool 2 where the predetermined fiber arrangement provides laying. Thus, the entire shaping tool 2 is occupied by fiber material 4.

The fiber material can be carried along by the laying units 3, 3', 3" in a reserve portion or supplied via an external supply.

FIG. 2A is a schematic front view of a device 1' for producing a fiber composite component in accordance with a further embodiment.

In this embodiment, unlike in FIG. 1, a hollow body 8 is provided as a running face 6, the inner face 9 thereof forming the running face 6. The shaping tool 2' is spaced apart from the running face 6 and arranged inside the hollow body 8 at least in part. The laying units 3, 3', 3" move on the running face and thus wind or twist around the tool 2', causing fiber to be laid on the tool 2'.

FIG. 2B is a schematic side view of a device for producing a fiber composite component in accordance with a further embodiment.

An example advancement path of the laying unit 3, 3', 3" is indicated using dashed arrows.

The twisting or winding around the tool 2' takes place in a predetermined manner. For example, the paths of the advancement of the laying units 3, 3', 3" when encircling the tool 2' may cross regularly in the manner of a maypole pattern, in such a way that a typical twisting pattern of the fiber material 4 on the tool 2' is produced. Other, in particular more complex twisting patterns can be produced with appropriately adapted advancement.

In the embodiment shown, the tool, which is of a length greater than the depth of the hollow body 8 or the width of the running face 6, is passed through the hollow body 8 during the twisting. It is in particular passed through continuously.

FIG. 3A, 3B show the device for producing a fiber composite component with a first modification.

Unlike in the embodiment of FIGS. 2A and 2B, in this case the running face 6 is of a width or the hollow body is of a depth greater than the length of the tool 2'. In this case, the tool 2' can therefore be arranged stationary inside the hollow body, the laying units 3, 3', 3" also advancing axially along the hollow body and thus being able to wind or twist fully around the tool 2'.

Figure 4A:
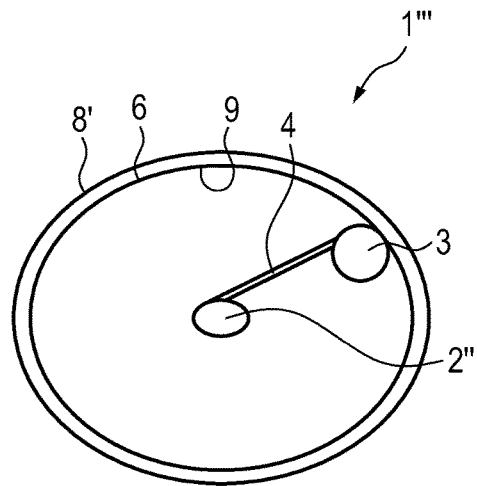
FIG. 4A, 4B show the device of FIG. 3A, 3B with a further modification.
Figure 4B:
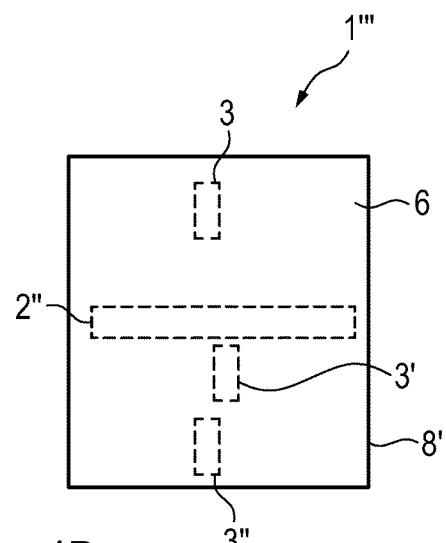

FIG. 4A, 4B show the device in accordance with FIG. 3A, 3B with a further modification.

In this modification, a more complex shape of a tool 2" is shown by way of example. The hollow body 8' is of a shape matching the shape of the tool 2". Varying distances of the tool 2" from a central axis are also varied on the hollow body 8 if appropriate and thus compensated. In the purely exemplary embodiment shown, the shape of the tool 2" and of the hollow body 8 is elliptical in cross section.

Instead of or in addition to an elliptical shape, any other types of complex shape are also conceivable. For example, the tool 2" and accordingly also the hollow body 8' could taper in the longitudinal direction thereof, in particular be formed in a domed shape. Further, the tool 2" and the hollow body 8' could also follow another shape which varies in the transverse and vertical directions.

Figure 5:
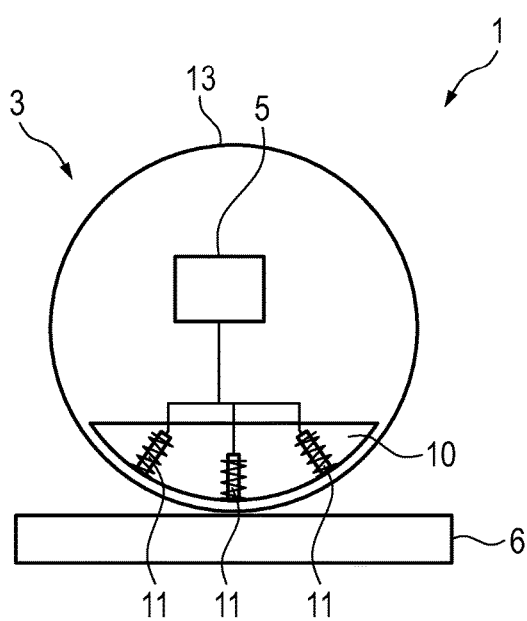
FIG. 5 is a schematic sectional view of an embodiment of a device for producing a fiber composite component.

FIG. 5 is a schematic side view of an embodiment of a device 1 for manufacturing a fiber composite component. This may be a device 1, 1', 1", 1''' formed in accordance with any of FIGS. 1 to 4B.

In this embodiment, the running face 6 is formed to be ferromagnetic. The laying unit 3 comprises a spherical housing 13. As an alternative to a spherical housing the housing may also be formed as a cylindrical, in particular circular cylindrical housing.

Inside the housing 13, a drive device 10 running movably along the inner wall of the housing 13 is provided. The drive device 10 is formed as a sphere-segment pendulum movable in the circumferential direction of the housing 13, and comprises magnets 11 actuable to act in various radial directions. In the case of a circular cylindrical housing, this is accordingly a cylinder-segment pendulum.

If the drive device 10 is shifted in the orientation thereof relative to the housing 13 by cooperation of the magnets 11 with the ferromagnetic running face 6, this also causes the housing 13 to follow or roll towards the drive device.

The magnets 11 are actuated accordingly to advance the laying unit 3 by the control device 5.

As an alternative to a freely movable pendulum, guide devices, for example a rail system or the like, for guiding the drive device 10 may be provided on the inner face of the housing 13.

Figure 6:
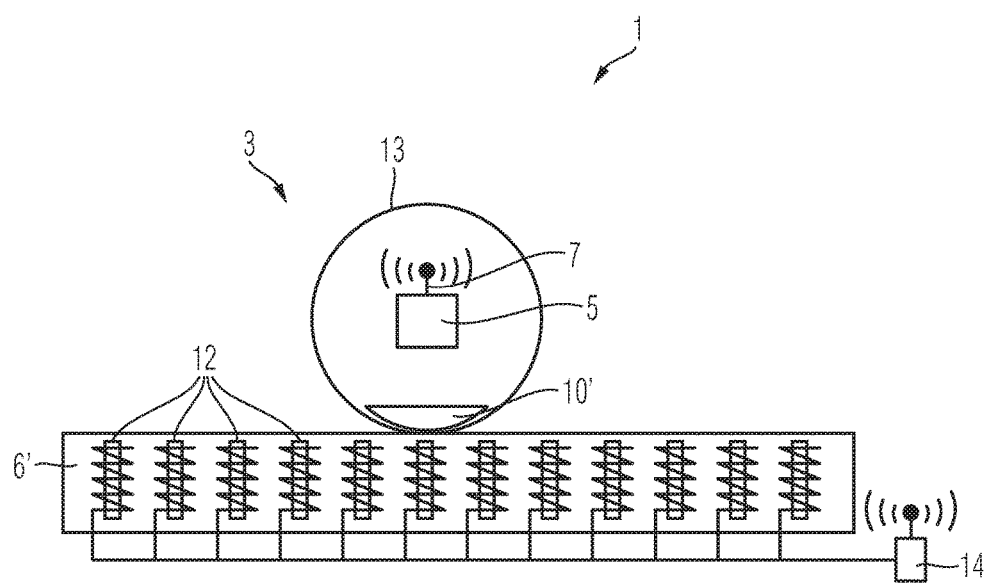
FIG. 6 is a schematic sectional view of a further embodiment of a device for producing a fiber composite component.

FIG. 6 is a schematic sectional view of a further embodiment of a device for producing a fiber composite component. This may also be a device 1, 1', 1", 1''' formed in accordance with any of FIGS. 1 to 4B.

In this embodiment, the running face 6' comprises a number of controllable magnets 12. The laying unit 3 comprises a drive device 10' cooperating therewith, which is for example also provided as a movable pendulum freely movable along the inner housing face. This is a ferromagnetic pendulum.

The controllable magnets 12 are coupled to a receiving device 14, which is formed to pass control commands of the control device 5 of the laying unit 3 to the individual magnets 12. The control device 5 is coupled to communication device 7 of the laying unit 3 in such a way that control signals can be transmitted to the receiving device 14.

Thus, the control device 5 can actuate the controllable magnets 12 individually in a manner suitable for advancement, and thus generate a magnetic field for attracting the drive device 10'. If the drive device 10' is for example attracted by a magnet 12 arranged to the side thereof, the device is deflected out of arrest position relative to the housing 13 of the laying unit 3. Thus, the housing 13 and thus the entire laying unit are also caused to follow or roll towards the magnet 12 presently generating the magnetic field.

The magnets 12 are accordingly actuated to advance the laying unit 3 by the control device 5.

In the following, possible embodiments of the laying unit 3 are described.

Figure 7A:
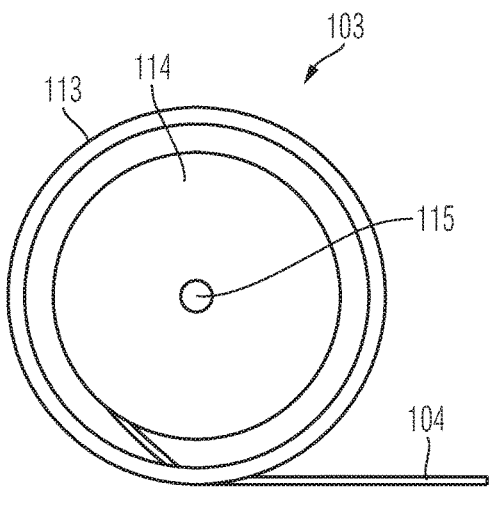
FIG. 7A is a schematic longitudinal sectional view of a spherical laying unit.
Figure 7B:
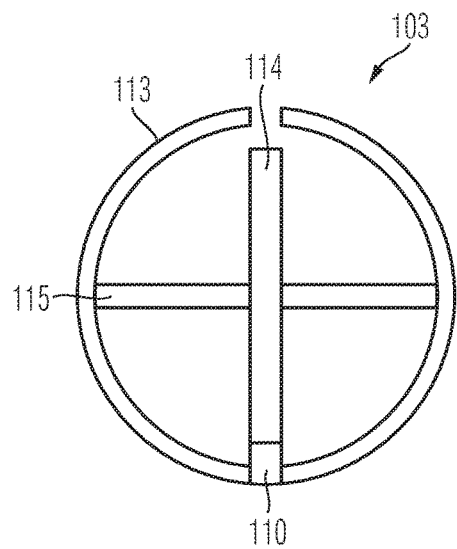
FIG. 7B is a schematic cross-sectional view of the laying unit of FIG. 7A.

FIG. 7A is a schematic longitudinal sectional view of a spherical laying unit 103. FIG. 7B is a schematic cross-sectional view of the laying unit 103 according to FIG. 7A.

The laying unit 103 comprises a spherical housing 113. A fiber coil 114 is mounted inside the housing 113. For mounting the fiber coil 114, a holding device 115 in the form of a shaft is provided, which braces the fiber coil 114 mechanically against the housing 113. The holding device 115 can be provided to be movable or stationary relative to the housing.

During advancement of the laying unit 103, the housing 113 rolls along on an associated running face (not shown here). Fibre material 104 is unwound from the fiber coil 114 and laid on a tool (not shown here).

To advance the laying unit 103, a drive device 110 is provided. This comprises magnets movable along an inner surface of the housing 113, which are formed controllably or as permanent magnets and/or [comprise] a ferromagnetic material. In particular, this may be a drive device as described with reference to FIG. 5 or FIG. 6.

As an alternative to the movable magnets or the ferromagnetic material, the drive device 110 may also be formed as a layer provided integrated into the housing or adjacent to the housing and having controllable magnets introduced into it.

Figure 8A:
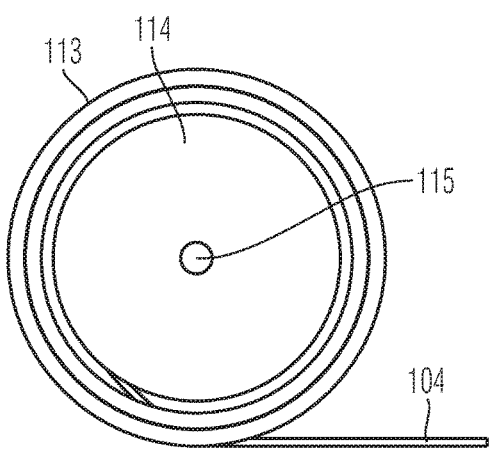
FIG. 8A, 8B show a laying unit in accordance with a further embodiment.
Figure 8B:
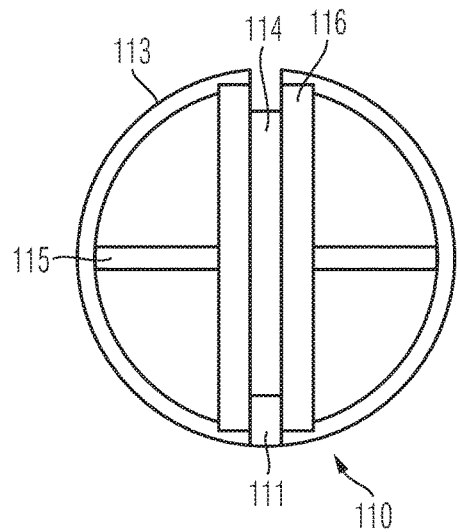

FIG. 8A, 8B show a laying unit in accordance with a further embodiment.

In this embodiment, the drive device 110 is formed with a magnet 111 encircling the housing 113 peripherally by way of a guide 116. This may be a permanent or a controllable magnet 111.

Figure 9A:
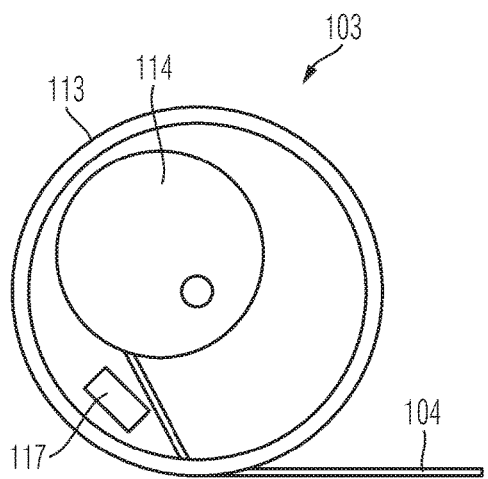
FIG. 9A, 9B show a laying unit in accordance with another further embodiment.
Figure 9B:
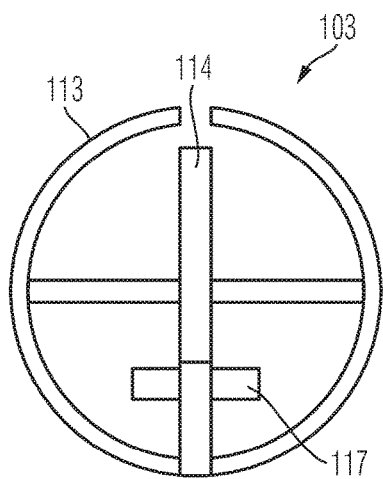

FIG. 9A, 9B show a laying unit in accordance with another further embodiment.

In this case, a sensor 117 downstream from the fiber material 104 is provided. For improved clarity, the drive device 110 is omitted in the drawing.

The downstream sensor 117 serves to measure the fiber quality of the fiber material 104. The sensor 117 may be various types of sensor, for example a laser stripe sensor, polarized light sensor, contact image sensor (CIS) or the like.

By the sensor 117, individual or a plurality of different quality factors can be detected. For example, a measurement of the width, a fiber strand weight or a resin wetting level of the fiber layer of fiber material 104 to be laid can be provided. Further, by the sensor, impurities such as film residues from a backing paper can be detected.

Alternatively or in addition, the downstream sensor 117 is provided for measuring the suitability of the surface of a material or component on which the fiber material 104 is to be laid. It is thus ensured that laying only takes place on a suitable surface, in particular the tool. Thus, for example defects, impurities or foreign substances on the surface can be detected. It is thus possible to react to defects or foreign substances of this type by way of a control device 105 (not shown here) of the laying unit 103, which actuates the drive device 110 to advance the laying unit 103. On the one hand, in reaction the laying of the fiber material 104 may be interrupted and a warning message may be emitted to an operator. Further, the path of the laying of the fiber material 104 can be corrected, in particular in an automated manner. It would further be conceivable to introduce a counter measure in reaction, in an automated or manually controlled manner. For example, cleaning, in particular by outputting pressurised air, to remove a foreign material or impurity could be provided by way of an actuator, in particular a cleaning nozzle, provided on the laying unit.

Figure 10A:
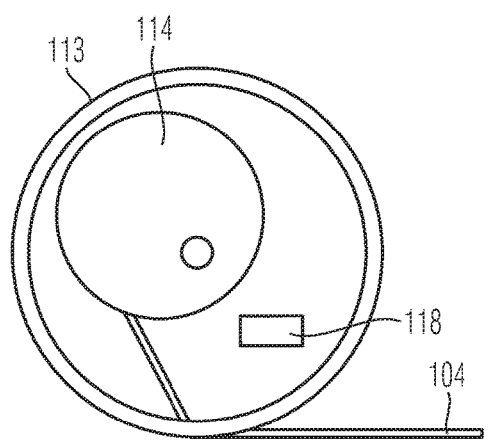
FIG. 10A, 10B show a laying unit in accordance with a further embodiment.
Figure 10B:
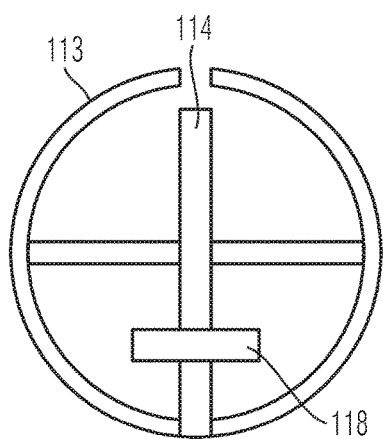

FIG. 10A, 10B show a laying unit 103 in accordance with a further embodiment. For improved clarity, the drive device 110 is omitted in this case too.

In this embodiment, a sensor 118 upstream from the fiber material 104 is provided for detecting the arrangement and/or quality of the laying of the fiber material 104. In this case too, the sensor 118 may be a wide range of types of sensor. For example, a laser stripe sensor, polarized light sensor, contact image sensor (CIS) or the like may be provided. In particular, errors in the laying of the fiber material 104 can thus be detected. For example, detectable errors in the laid fiber material 104 may be gaps between the laid fiber layers or tapes, twists, a splice in a fiber strand, an undesired overlap or undesired knotting (fuzzballs) and any undesired film residues.

FIG. 11A is a schematic longitudinal sectional view of a cylindrical laying unit 203. FIG. 11B is a schematic cross-sectional view of the laying unit 203 of FIG. 11A.

Unlike the spherical laying units 103, the cylindrical laying unit 203 is formed with a cylindrical, in this case circular cylindrical housing 213.

Inside the housing 213, by way of example a plurality of six fiber coils 214 arranged side by side are provided. Any other desired number of fiber coils, in particular including a single fiber coil, may be provided.

A surface of the cylindrical housing 213 is recessed in the region of the fiber coils 214.

To mount the fiber coils 214, a holding device 215 (only shown in FIG. 11A for improved clarity) in the form of a shaft is provided, and braces the fiber coils 214 mechanically against the housing 213.

During advancement of the laying unit 203, the housing 213 rolls along on an associated running face. Fibre material 204 is unwound from the fiber coils 214 and laid on the tool.

To drive the advancement of the laying unit 203, the cylindrical housing 213 comprises a drive device 210. This is formed with magnets, in particular controllable or permanent, which are movable along an inner surface of the housing 213. Alternatively or in addition, the drive device 210 may contain a ferromagnetic material. This may in particular be a drive device as described with reference to FIG. 5 or FIG. 6.

Further, as an alternative or in addition to the movable magnets or the ferromagnetic material, the drive device 210 may also be formed as a layer provided in the housing 213 or adjacent to the housing 213 and having controllable magnets introduced into it.

FIG. 12A, 12B show a laying unit 203 in accordance with a further embodiment. For improved clarity, the drive device 210 is omitted here.

In the embodiment shown here, a sensor 218 upstream from the fiber material 204 is provided for detecting the arrangement and/or quality of the laying of the fiber material 204. The sensor 218 may be various types of sensor for detecting various errors in the laying of the fiber material 204, as described with reference to FIGS. 10A and 10B for the sensor 118.

The fiber coils 214 are formed with a lower diameter in this case. An elongated test path is thus available for testing, the sensor 218 being positioned in such a way that it can also measure the fiber quality of the fiber material 204 prior to laying.

Figure 13A:
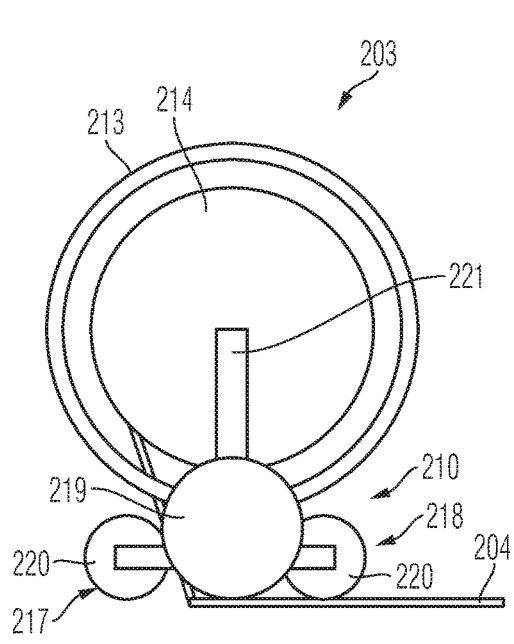
FIG. 13A, 13B show a laying unit comprising a drive roller.
Figure 13B:
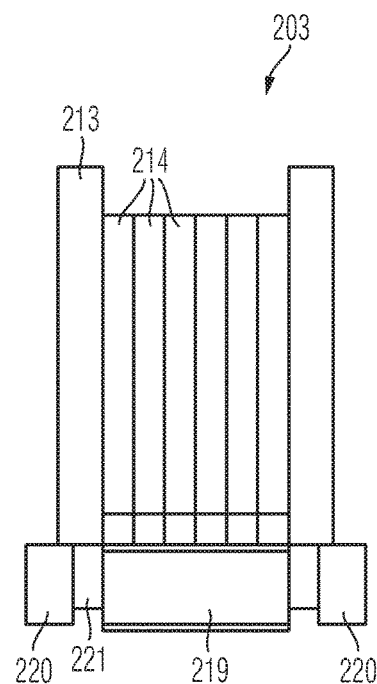

FIG. 13A, 13B show a laying unit 203 comprising a drive roller 206.

In this case, in addition to the drive roller 219 the drive device 210 is formed with laterally arranged support rollers 220. The drive device 210 is coupled to the housing 213 via a coupling device 221, and carries the housing 213. Thus, unlike in the above-described cylindrical laying units 203, in this case the housing 213 does not itself roll along on the running face for advancement. This functionality is instead provided by the drive roller 219 and the support rollers 220.

The drive roller 219 is preferably magnetically driven. For this purpose, it comprises for example controllable magnets (not shown for improved clarity) which are actuable for magnetically driven advancement by a control device 205 of the laying unit 203.

Alternatively or in addition, the drive roller 219 may contain permanent magnets and/or a ferromagnetic material, a drive of the [drive roller] 219 being provided by a magnetic field, which can be excited by an associated running face provided for the laying unit 203. For this purpose, the running face may be provided with a number of controllable magnets, as described for example with reference to FIG. 6.

Further, the drive roller may also be formed with a magnetic and/or ferromagnetic pendulum movable therein.

Figure 14A:
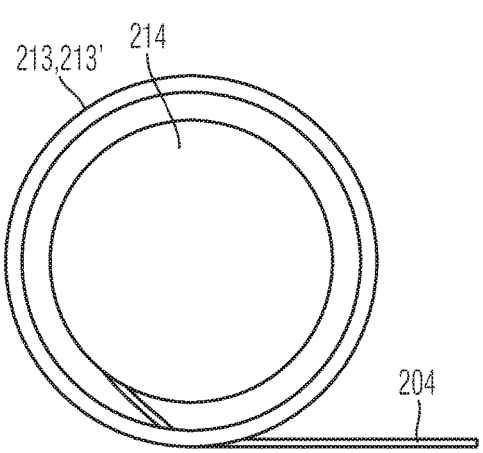
FIG. 14A, 14B show a laying unit comprising movable fiber coils.
Figure 14B:
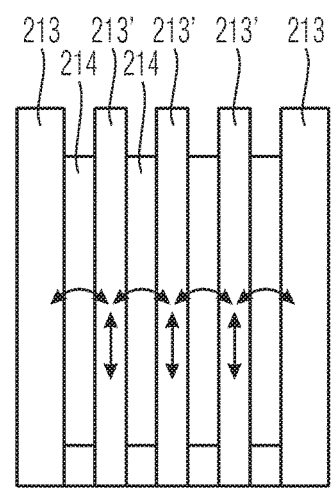

FIG. 14A, 14B show a laying unit 203 comprising movable fiber coils 214.

The movable fiber coils 214 are arranged spaced apart. In the region of each gap between the fiber coils 214, a housing portion 213' is provided in each case which is formed in such a way that it makes movement of the fiber coils 214 in the region of the gap possible.

The distance between the fiber coils 214 is in particular equal to the width of a fiber coil 214 and/or a fiber layer or laying path of the fiber material 204 respectively laid thereby.

The fiber coils 214 are provided movably so as to be able to be laterally tiltable. Accordingly, the fiber coils 214 are mounted tiltably on the holding device 215 (not shown here for improved clarity). As a result, fiber material 204 can also be laid on curved or doubly curved surfaces.

The housing portions 213' are movable in a direction perpendicular to an axis of the housing 213, in this case in particular vertically, and can thus prevent bumps in a tool. As an alternative to the housing portions 213' being displaceable, it would also be conceivable to provide that the housing portions 213' are elastically deformable or compressible to prevent bumps.

For continuously laying fiber material, the same path is preferably travelled twice by a laying unit 203 of this type, in the same or the opposite direction, with an offset of one fiber coil width or fiber layer width.

Individual or all of the housing portions 213' may be provided with additional drive devices 210.

FIG. 15A, 15B show a laying unit 203 comprising a laying device 222.

Both the drive device 210 and the laying device 222 are formed with the drive roller 219. In addition to the drive roller 219, the drive device 210 and the laying device 222 comprise lateral support rollers 220 and are coupled to the housing 213 via a coupling device 221.

The laying device 222 serves to lay and/or compact a fiber layer of the fiber material 204 in a defined manner. The laying unit 203 can thus advantageously also be used to compact previously laid fiber material.

The forces applicable by the laying device 222 for laying and/or compacting in a defined manner can be regulated or set by way of the strength of the magnetic field provided for advancing and/or holding the laying unit on the running face.

The support rollers 220 may be formed as an upstream sensor system, which has a functionality analogous to the upstream sensor 218. Alternatively or in addition, the support rollers 220 may be provided for compacting the fiber material 204.

The drive roller 219 may be provided as a heating device for activating a resin or binder of a laid fiber layer of the fiber material 204. In particular, the drive roller is provided with a magnetic drive, which generates eddy currents when the laying unit moves if they contain ferromagnetic material. The eddy currents heat the drive roller and/or the running face locally because of the electrical resistances thereof. The heating device is thus formed as a drive roller which heats itself during advancement and/or as a drive roller which heats the running face.

Preferably, a combined embodiment of the drive roller 219 is provided, as a laying device 222 for laying and/or compacting in a defined manner and as a heating device 225 for activating a resin or binder.

FIG. 16A, 16B show a laying unit 203 in accordance with a further embodiment.

Unlike in the embodiment of FIGS. 15A and 15B, in this case the drive roller 219 is provided as a single roller carrying the housing 213.

To stabilise the laying unit 203, an additional bracing device (not shown) may be provided. Alternatively, a control device 205 (not shown) for actuating the drive roller 219 may be provided, which actuates the drive roller 219 in such a way that the laying unit 203 is held stationary on the drive roller 219 in constant balance or equilibrium. It is also possible to provide a further, counteracting motor. This may be provided at a connection between the coupling device 221 and the housing 213 and additionally serve to stabilise the laying unit 203.

In this case too, the drive roller 219 is preferably formed to be magnetically driven. It may simultaneously provide the propulsion for advancing the laying unit 203 and for compacting the laid fiber material 204.

Figure 17A:
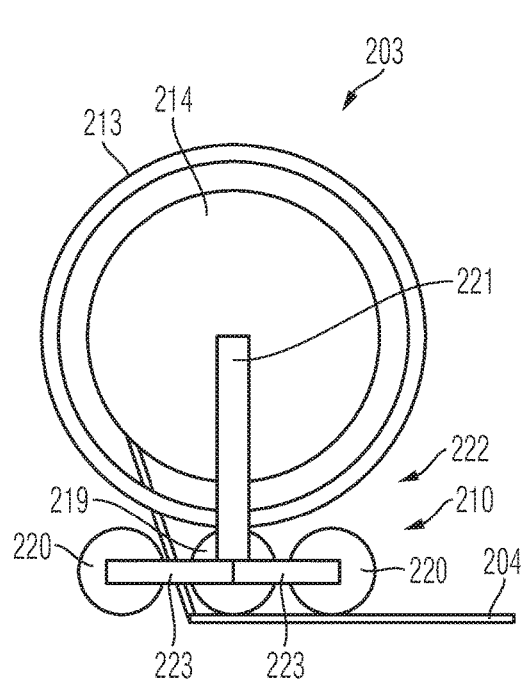
FIG. 17A, 17B show a laying unit in accordance with another further embodiment.
Figure 17B:
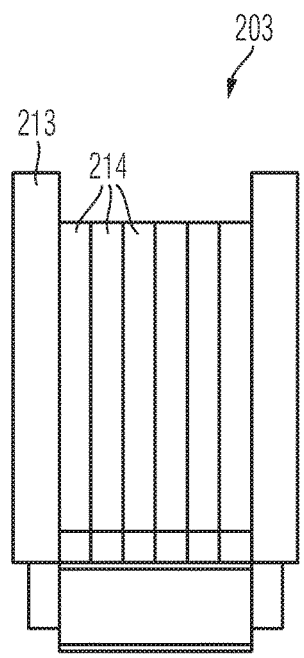

FIG. 17A, 17B show a laying unit 203 in accordance with another further embodiment.

The embodiment shown here draws on the embodiment of FIGS. 15A and 15B. By way of difference, a support roller 220 downstream from the fiber material 204 is additionally provided.

In this case, the coupling device 221 is formed in multiple parts, with two connecting portions 223 for the support rollers 220, the downstream and upstream support roller 220 being mounted in a movable manner with respect to the drive roller 219 by way of the connecting portions 223. Thus, even curved surfaces can reliably be travelled.

The downstream support roller 220 may contain a downstream sensor 217. In this case, the downstream sensor 217 is provided for measuring the fiber quality of the fiber material 204 and/or for measuring the suitability of the surface of a tool or component on which the fiber material 104 is to be laid. The sensor 217 may be various types of sensor, the functionalities of which are as described with reference to FIGS. 9A and 9B for the downstream sensor 117.

Figure 18A:
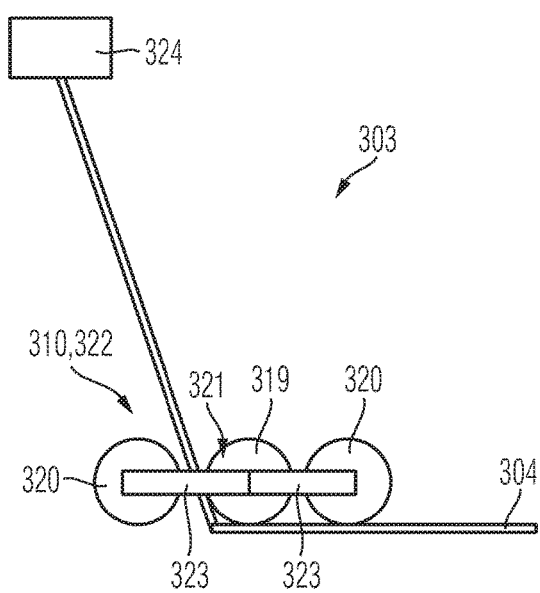
FIG. 18A, 18B show a laying unit comprising an external supply device for fiber material.
Figure 18B:
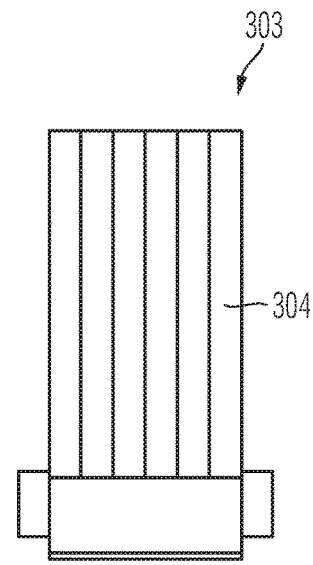

FIG. 18A, 18B show a laying unit 303 comprising an external supply device 324 for fiber material 304.

The supply device 324 may for example be provided mounted on a freely movable suspension, in such a way that it can advance freely together with the laying unit 303. Preferably, the fiber material 304 is held in reserve in the supply device 324. Accordingly, here the laying unit 303 does not comprise a housing for holding fiber material in reserve.

The laying unit 303 comprises a drive device 310 and laying device 322 of the same construction as in the embodiment of FIGS. 17A and 17B. The coupling device 321 is here provided without a vertical portion and merely with the connecting portions 323 for movably mounting the front and rear support rollers 320.

The front and rear support rollers 320 may also, as described previously for the laying unit 203, comprise downstream or upstream sensors. The support roller 320 upstream from the fiber material 304 may optionally or additionally be provided for compacting the fiber material 304.

The drive roller 319 is preferably also formed to be magnetically driven. Optionally or additionally, it may be formed as a heating element.

Although the present disclosure has been described in the above by way of preferred embodiments, it is not limited thereto, and can be modified in various ways.

For example, the laying device and/or the heating device may also be formed integrally with a drive device provided in the housing.

Further, the drive device may optionally or additionally also be formed as a layer of the laying unit which is provided in an outer skin or close to an outer skin and which is magnetisable by an actuation system. In particular, actuable electromagnets may be integrated into the outer skin or into the layer. To advance the laying unit, the magnetic field is displaced along the outer skin or magnetisable layer in the desired direction of travel by corresponding actuation.

In addition to a controllable magnetic field, a constantly acting or static magnetic field may also be provided between the laying unit and the running face. In this way, the laying unit can be held on the running face independently of the advancement, for example including during overhead operation. Further, in this way a compacting force applied to the fiber material by the laying unit can also be set to a predetermined value.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A laying unit for producing a fiber composite component, comprising:
    a drive device which is formed for magnetic cooperation with a running face, wherein the running face provides a magnetic field and/or is ferromagnetic, to advance the laying unit on the running face,
    wherein the drive device comprises at least one ferromagnetic mass element which holds the laying unit on the running face during cooperation with the running face providing a magnetic field and/or which drives the laying unit in a predetermined advancement.

2. The laying unit of claim 1, further comprising a receiving portion formed with a housing.

3. The laying unit of claim 2, wherein the drive device is provided on or in the housing, wherein the housing is configured to be rolled along on the running face to advance the laying unit.

4. The laying unit of claim 3, wherein the ferromagnetic mass element is movable peripherally on the housing.

5. The laying unit of claim 2, wherein the drive device is formed as a drive roller coupled to the housing.

6. The laying unit of claim 2, wherein the receiving portion is configured to hold a supply of fiber material in reserve.

7. The laying unit of claim 1, wherein the drive device is a laying device for laying and/or compacting a fiber material on a tool in a defined manner.

8. The laying unit of claim 1, wherein the drive device includes a heating device for activating a resin or binder of a fiber material.

9. The laying unit of claim 8, wherein the heating device is configured to be heated by eddy currents.

10. A device for producing a fiber composite component, comprising:
    a shaping tool; and
    a laying unit for laying fiber material comprising a drive device which is formed for magnetic cooperation with a running face, which provides a magnetic field and/or is ferromagnetic, to advance the laying unit on the running face,
    wherein the running face is ferromagnetic, and the drive device comprises magnets which are configured to advance on the running face by way of magnetic cooperation of the drive device with the running face, or
    wherein the running face contains controllable magnets, which are formed to be actuable to cooperate with the drive device for magnetically driven advancement of the laying unit on the running face.

11. The device of claim 10, wherein the shaping tool is the running face, which is ferromagnetic.

12. The device of claim 10, further comprising:
    a hollow body having an inner face which is formed as the running face for the laying unit,
    the shaping tool being arrangeable inside the hollow body such that the laying unit advancing on the running face winds or twists the fiber material around the shaping tool.

13. The device of claim 10, wherein the running face comprises communication devices which are configured to transmit control commands of a control device to actuate the controllable magnets for the advancement of the laying unit.

14. The device of claim 13, wherein the control device is integrated into the laying unit.

* * * * *